Jan. 9, 1968 E. LIND ET AL 3,363,099
METHOD FOR PRODUCING A LATENT ELECTROSTATIC IMAGE ON AN ELECTROSTATICALLY CHARGED RESIN LAYER BY EXPOSURE TO RADIANT HEAT
Filed Jan. 7, 1960
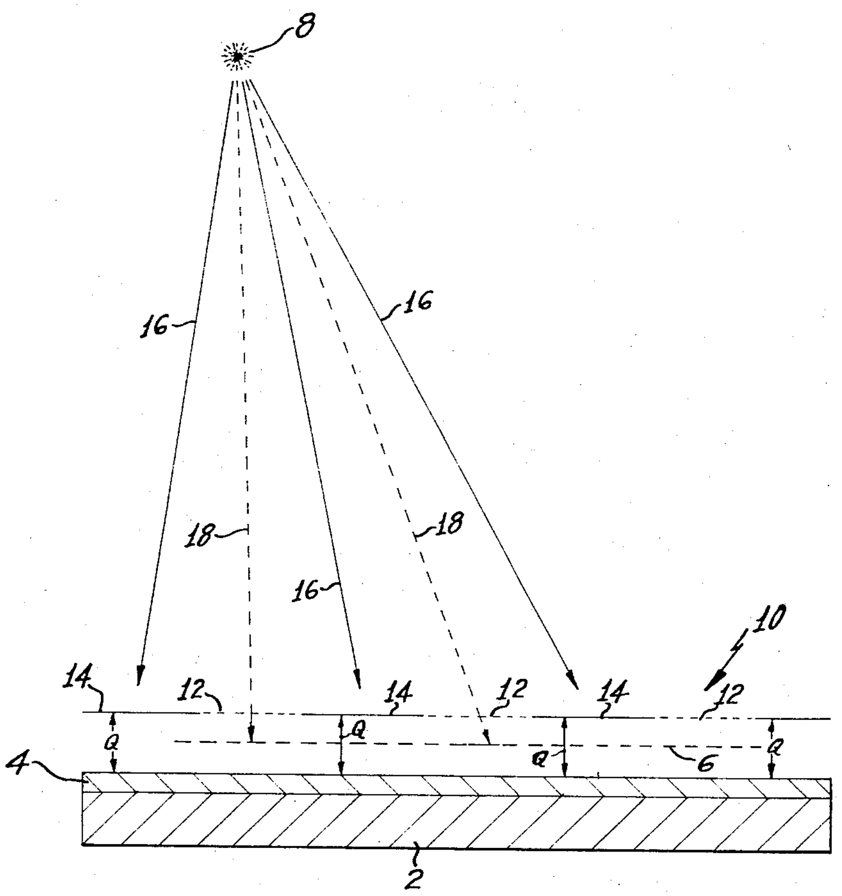
INVENTORS
ERWIN LIND
HEINZ KRAMER
BY James E. Bryan
ATTORNEY United States Patent Office 3,363,099
Patented Jan. 9, 1968

3,363,099
METHOD FOR PRODUCING A LATENT ELECTROSTATIC IMAGE ON AN ELECTROSTATICALLY CHARGED RESIN LAYER BY EXPOSURE TO RADIANT HEAT

Erwin Lind and Heinz Krämer, Wiesbaden-Biebrich, Germany, assignors, by mesne assignments, to Azoplate Corporation, Murray Hill, N.J.
Filed Jan. 7, 1960, Ser. No. 938
Claims priority, application Germany, Jan. 15, 1959, K 36,732
6 Claims. (Cl. 250—65)

Among modern reproduction processes the electrophotographic process, also known as xerography, has become of increasing practical importance in recent years. This modern copying process consists in forming a photoconductive layer on a support consisting of a substance with sufficient electrical conductivity and charging this layer electrostatically. Substances present in the photoconductive layer, which diminish their electrical resistance under the influence of light, the so-called photo-semiconductors, cause the electrostatic charge to leak rapidly away from the layer at the light-struck areas. The photo-semiconductive layers are charged in the absence of light and are exposed to light under a pattern, either by means of a contact process or an optical process. By the above exposure to light an electrostatic image of the pattern is obtained on the photoconductive layer, which is colored by means of a colored powder that is also electrostatically charged. The image which now becomes visible is either fixed immediately or after being transferred onto another image support.

An object of the present invention is a process, in which the electrostatic image is produced by the influence of heat rays instead of light rays. The process according to the invention utilizes the property of certain substances to change their electrical resistance with a change of temperature.

By the process of the invention a support consisting of a substance having a satisfactory electrical conductivity is coated with a resin layer which diminishes its specific electrical resistance under the influence of heat and the layer is given an electrostatic charge and then exposed to heat radiation under a pattern.

The invention will be further illustrated by reference to the accompanying drawings in which the drawing is a schematic illustration of the process of the present invention.

Referring to the drawing, a suitable support layer 2 has a resin layer 4 thereon, the resin layer comprising a resin having a specific resistance which varies with temperature. The resin layer 4 is subjected to an electrostatic charge indicated by the dashes 6, the electrostatic charge being produced by means of a corona discharge, for example, and the resin layer is then exposed to radiant heat from a source of radiation 8 which emits rays in the infra-red range, the rays passing through a master or pattern, generally indicated at 10, the pattern having the light areas 12 and the dark areas 14 thereon. The solid lines 16 indicate heat rays which are absorbed by the dark areas 14 of the pattern, and thereby preferentially heat the dark areas, whereas the dashed lines 18 indicate heat rays which pass through the light areas of the pattern without being absorbed and, therefore, without heating the light areas.

Heating of the resin layer 4 in the areas corresponding to the dark areas 14 of the pattern is effected by heat conduction from the master 10 and the electrical resistance of the resin layer 4 is decreased in the areas under the dark portions 14 of the pattern by the conduction of a quantity of heat Q from the dark areas 14 of the pattern to the corresponding areas of the resin layer 4 as shown in the drawing.

For the resin layer on the support, resins are used whose specific resistance during the charging process is within the range of about $10^{12}$ ohm-cm. to about $10^{19}$ ohm-cm., so that the electrostatic charge applied thereto cannot leak away. At the contacting surfaces, with the infra-red absorbing image-areas of the pattern, the specific resistance of the resins, under the influence of heat, preferably should be about two decimal powers or more lower so that the charge can flow away from the contacting surfaces. Preferably, the specific resistance of the resin layer, as reduced under the influence of heat, should be under about $10^{10}$ to about $10^{12}$ ohm-cm. The suitability of a resin layer for the process according to this invention can be ascertained, e.g., by measuring the variation, with temperature, of the resistance of the layer to the flow of electric current, in order to determine whether with a given rise in temperature, a sufficient decrease in resistance results. If the resin layer coated onto the support shows an insufficient decrease of resistance with a rise of temperature, as is the case with some resins, e.g. polystyrene, the required resistance frequently is obtained by adding plasticizers to the respective resin—in the case of polystyrene, for example, tricresylphosphate has proved suitable.

Resins to be used according to the invention are both synthetic resins and natural resins, including modified natural resins. In order to produce on the layer support the thermo-electroconductive layer which is to absorb the electrostatic charge, all methods suitable to form resin layers can be employed. For instance, a solution or an aqueous or a non-aqueous dispersion of the resin is coated onto the layer support and dried, or a film, obtained from the resin, is combined with the support. The resin may also be coated onto the support in a liquefied form (melt) in order to form the insulating layer. Very useful are the following water-insoluble synthetic resins which have good insulating properties at normal temperatures: polyvinyl chloride, afterchlorinated polyvinyl chloride, copolymers of vinyl chloride and butadiene, afterchlorinated caoutchouc, polystyrene, polyterephthalic acid ester, polyethylene, polyvinyl acetate, coumarone resins, maleic acid resins, and ketone resins, copolymers of polyvinyl chloride and polyvinyl acetate, copolymers of polyvinyl chloride and vinyl isobutyl ether, colophony - modified phenolic resins, cyclised rubber and alkyd resins. Suitable as modification products of natural resins are dimerised abietc acid, resin esters, e.g. pentaerythrite esters of resin acids, lime resins and zinc resins. Of natural resins there are particularly suited for the preparation of the insulating layer shellac, colophony, and dammar resin. The resins can also be used in association with one another. The thickness of the coating is preferably adjusted to 10 to 30$\mu$. There may also be used layers of only a few microns' thickness, e.g. 6 microns. The admissible minimum thickness depends on the insulating properties of the layer used. The thickness of the layer is chosen so that the layer is not pierced while applying the electrostatic charge, as otherwise defective images are obtained. The insulating coatings are not in the least light sensitive, even after being electrostatically charged.

The base materials used as supports may be any that have sufficient electrical conductivity, e.g. metal foils or plates, glass plates which have been made superficially electroconductive, paper, plates or films made of electrically conductive fiberless material (plastics, resins). As sufficiently electroconductive are generally regarded substances which have a specific resistance of not more than $10^{11}$ ohm-cm., but materials of higher resistance may also be used in some cases, especially if the resistance of the layer is very high.

If paper is to be used as the support for the thermoelectroconductive layer, pretreatment of the paper against penetration of the coating solution is advisable, for example with methyl cellulose in aqueous solution or polyvinyl alcohol in aqueous solution or with a solution of a copolymer of acrylic acid methyl ester and acrylonitrile in acetone and methylethylketone, or with solutions of polyamides in aqueous alcohols. Aqueous dispersions of substances suitable for the pretreatment of the paper surface may also be used.

A paper support coated with a thermoelectroconductive layer according to the present invention is charged electrostatically by means of a corona discharge, for example, and is briefly exposed under a pattern to the influence of radiant heat. A latent electrostatic image of the pattern is thus formed on the resin layer. As the heat is more intensely absorbed by the dark areas of the pattern than by the light areas, the electrical resistance of the resin in the layer will decrease more under the dark areas of the pattern than under the light areas of the pattern. This results in a differentiated discharge of the resin layer and thus to the formation of a negative electrostatic image from the pattern.

Any heat sources which emit an intensive heat, usually infra-red radiators, may be used.

The images produced according to the present invention are developed, i.e. made visible, by the methods known in electrophotography, for example by dusting them over with a colored resin powder, a procedure which is well known from electrophotographic processes. A visible negative of the pattern is obtained when using a powder which is attracted by the charged areas and an image corresponding to the pattern when using a powder which is repelled.

The invention will be further illustrated by reference to the following specific examples:

*Example 1*

10 g. of chlorinated polyvinyl chloride, e.g. 10 g. of "Rhenoflex" are dissolved in 300 ml. of toluene. Paper which has been precoated with an aqueous dispersion of polyvinylidene resin, is coated with this solution. The layer thus applied is dried at about 60° C. and the paper is then given a surface potential of about 300 volts by means of a corona discharge. Under a heat-permeable positive original, e.g. a transparent original or paper sheet printed on one side, the electrostatically charged paper is exposed for a short time to the influence of radiant heat. A latent negative electrostatic charge pattern of the original is thus produced. In order to render visible this negative charge pattern, i.e. to develop it, it is dusted over with a developer which is produced by intimately mixing 100 g. of tiny glass balls having a grain size of 350–400$\mu$ and 2.5 g. of a colored resin powder, a so-called toner, having a grain size of 20–50$\mu$. The colored resin powder is repelled by those parts of the resin layer which during heat radiation lay under the light parts of the original, and were positively electrostatically charged, and is attracted by those parts of the layer which during radiation lay under the black parts of the original and were to a degree discharged. A positive powder image is thus produced which is fixed by heat or by the application of vapors of solvents.

The toner just mentioned is prepared by melting together.

30 g. of polystyrene
30 g. of a maleinate resin, e.g. the product "Beckacite K 105"
3 g. of carbon black, e.g. the product "Peerless" Black Russ S 52

After cooling, the melt is ground and screened. The screened portion which has a grain size of 20–50$\mu$ is used as the toner in the developer powder for electrostatic charge images.

*Example 2*

A paper base which by extrusion has been coated with a polyethylene layer of about 15$\mu$ thickness is by means of a corona discharge provided with an electrostatic positive surface potential of about 400 volts. The electrostatically charged paper is then placed with its layer side onto a printed original and then exposed from its layer free side to a short heat treatment by a powerful infrared radiator. By this treatment, a reverse electrostatic negative charge image is produced in the polyethylene layer which is then developed by the method described in Example 1. A positive image of the original is thus obtained. If a sheet of paper, a plastic film or a textile fabric is firmly pressed on this positive powder image, the image is transferred and a non-reversed positive image of the original is obtained on the paper, the foil or textile fabric, respectively. During the production of the non-reversed image, an electrical field may be applied, as is known per se, to the paper or foil to carry the non-reversed image. If a transparent paper or film is used, intermediate originals are obtained which can be used for making further reproductions, for example on diazo paper.

*Example 3*

A polyterephthalic acid ester film of a thickness of about 6.5$\mu$ is combined with or placed onto a paper base and given an electrostatic charge. It is then exposed to heat radiation in a contact copying process under a heat permeable original, for example a typewritten copy. The negative electrostatic image produced by heat radiation is made visible by dusting over with colored resin powder, and the powder image is fixed by a brief after-treatment with heat.

*Example 4*

A paper base is mechanically coated with a solution consisting of 60 g. of polystyrene and 6 g. of tricresylphosphate dissolved in 1000 ml. of benzene and then dried at about 60° C. By means of a corona discharge, the resin layer thus formed is given a positive surface potential of about 400 volts. An original consisting of a paper sheet, printed on one side only, is placed with the printed side thereof against the charged resin layer and the unprinted side thereof is heated for a short time by means of an infra-red radiator. Subsequently, the original is removed and the resin layer is dusted over with the mixture of black resin powder and glass balls described in Example 1. A mirror image of the original is thus obtained which may be transferred onto paper, a plastic film or textile fabric. Thus a non-reversed image is produced on the paper, the film or the textile fabric and may be fixed by the influence of heat or by means of solvent vapors.

*Example 5*

4 g. of a copolymer of styrene and maleic acid anhydride are dissolved in 40 ml. of methylethylketone, and a brushed aluminum foil is coated with this solution by means of brushes. After the layer has been dried by means of warm air, the coated aluminum foil is given a positive electrostatic charge by means of a corona discharge. Subsequently, the charged aluminum foil is exposed to heat radiation under an original, using, for example, an infra-red radiator, thus producing a latent negative electrostatic charge pattern of the original in the resin layer. The image is developed with the developer described in Example 1 and a positive powder image is obtained which is then fixed by a heat treatment. Alternatively, the resin layer, consisting of the copolymer of styrene and maleic acid anhydride, may be removed with an alkaline aqueous solution so that the baked-in powder image is left on the aluminum foil, which then may be inked with greasy ink in order to use the aluminum foil as a positive printing plate for offset printing.

It will be obvious to those skilled in the art that many modifications may be made within the scope of the present invention without departing from the spirit thereof, and the invention includes all such modifications.

What is claimed is:

1. A process for producing electrostatic images which comprises subjecting a supported layer consisting essentially of a resin, having a specific resistance which decreases with increasing temperature, to an electrostatic charge and exposing the charged layer to radiant heat under a pattern for a time and at a temperature sufficient to produce a latent electrostatic image on the layer.

2. A process according to claim 1 in which the support is paper.

3. A process for producing electrostatic images which comprises coating a support with a layer consisting essentially of a resin, having a specific resistance which decreases with increasing temperature, subjecting the supported layer to an electrostatic charge and exposing the charged layer to radiant heat under a pattern for a time and at a temperature sufficient to produce a latent electrostatic image on the layer.

4. A process according to claim 3 in which the support is paper.

5. A process according to claim 3 in which the image is developed by treatment with powder.

6. A process for producing electrostatic images which comprises subjecting a supported layer consisting essentially of a resin and a plasticizer, the resin having a specific resistance which decreases with increasing temperature, to an electrostatic charge and exposing the charged layer to radiant heat under a pattern for a time and at a temperature sufficient to produce a latent electrostatic image on the layer.

References Cited

UNITED STATES PATENTS

| | | | |
|---|---|---|---|
| 2,798,960 | 7/1957 | Moncrieff-Yeates | 250—65 |
| 2,907,674 | 10/1959 | Metcalfe et al. | 250—65 X |

WILLIAM F. LINDQUIST, *Primary Examiner.*

RALPH G. NILSON, *Examiner.*

J. CAMPBELL, *Assistant Examiner.*

Notice of Adverse Decision in Interference

In Interference No. 96,541 involving Patent No. 3,363,099, E. Lind and H. Kramer, METHOD FOR PRODUCING A LATENT ELECTROSTATIC IMAGE ON AN ELECTROSTATICALLY CHARGED RESIN LAYER BY EXPOSURE TO RADIANT HEAT, final judgment adverse to the patentees was rendered July 30, 1971, as to claims 1, 2, 3, 4 and 5.

[*Official Gazette December 21, 1971.*]